US010190699B2

(12) United States Patent
Ulbricht et al.

(10) Patent No.: US 10,190,699 B2
(45) Date of Patent: Jan. 29, 2019

(54) ELECTROMAGNETIC ACTUATOR AND VALVE

(71) Applicant: ZF Friedrichshafen AG, Friedrichshafen (DE)

(72) Inventors: Markus Ulbricht, Tettnang (DE); Michael Pantke, Friedrichshafen (DE); Raphael Baumann, Grünkraut (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 13 days.

(21) Appl. No.: 15/446,249

(22) Filed: Mar. 1, 2017

(65) Prior Publication Data

US 2017/0254438 A1    Sep. 7, 2017

(30) Foreign Application Priority Data

Mar. 4, 2016 (DE) .................. 10 2016 203 602

(51) Int. Cl.
*F16K 31/06* (2006.01)
*F16K 31/08* (2006.01)
*H01F 7/16* (2006.01)

(52) U.S. Cl.
CPC ...... *F16K 31/0679* (2013.01); *F16K 31/0655* (2013.01); *F16K 31/082* (2013.01); *H01F 7/1615* (2013.01); *H01F 2007/1669* (2013.01); *H01F 2007/1692* (2013.01)

(58) Field of Classification Search
CPC .... F16K 31/08; F16K 31/082; F16K 31/0679; F16K 31/0655; H01F 7/1615; H01F 2007/1669; H01F 2007/1692

USPC .......................................................... 251/65
See application file for complete search history.

(56) References Cited

U.S. PATENT DOCUMENTS

| 3,814,376 | A | * | 6/1974 | Reinicke | ............... | F16K 31/082 |
| | | | | | | 251/129.1 |
| 4,403,765 | A | * | 9/1983 | Fisher | ................... | F16K 31/082 |
| | | | | | | 137/625.65 |
| 4,779,582 | A | | 10/1988 | Lequesne | | |
| 4,794,890 | A | * | 1/1989 | Richeson, Jr. | ............ | F01L 1/16 |
| | | | | | | 123/90.11 |
| 5,029,807 | A | | 7/1991 | Fuchs | | |
| 5,529,281 | A | * | 6/1996 | Brudnicki | ............... | F16K 1/123 |
| | | | | | | 251/129.03 |
| 7,481,415 | B2 | * | 1/2009 | Reinicke | ............... | F16K 31/082 |
| | | | | | | 251/129.1 |

(Continued)

OTHER PUBLICATIONS

German Office Action in priority application DE 10 2016 203 602.5 dated Oct. 12, 2016 in German language (with English language translation of p. 11).

*Primary Examiner* — Matthew E Jellett
(74) *Attorney, Agent, or Firm* — Brinks Gilson & Lione

(57) ABSTRACT

The invention relates to an electromagnetic actuator and a valve having such an actuator. The actuator has a first magnetic coil and a second magnetic coil, as well as at least one permanent magnet and an anchor that can be moved axially by the magnetic coils and the permanent magnet between a first and a second position, on which at least one spring device acts in the axial direction. The first and second magnetic coils as well as the first permanent magnet are disposed axially behind one another thereby, such that the first permanent magnet is disposed coaxially between the first and second magnetic coils.

16 Claims, 2 Drawing Sheets

(56) References Cited

U.S. PATENT DOCUMENTS 9,435,460 B2* 9/2016 Herbert .................... F16K 7/16
2016/0327176 A1* 11/2016 Nemoto ................ F16K 31/082

* cited by examiner

ELECTROMAGNETIC ACTUATOR AND VALVE

PRIORITY STATEMENT

This application claims the benefit of German Patent Application DE 10 2016 203 602.5, filed Mar. 4, 2016, and incorporates the German Patent Application by reference herein in its entirety.

FIELD

The present disclosure relates to an electromagnetic actuator, in particular a valve actuator, and a valve, in particular a pneumatic or hydraulic valve, having such an actuator.

BACKGROUND

Known valve actuators have a first permanent magnet, as well as a first magnetic coil and an anchor that can be moved axially by the first magnetic coil and the first permanent magnet. At least one spring device acts against this in the axial direction, e.g. one or more helical springs. When the actuator is used as a valve actuator, the anchor interacts with a closing element to block a discharge opening of the valve, such that the closing element closes the associated valve when the anchor is in a first position, and opens it when the anchor is in a second position.

An actuator of this type and a valve of this type can be derived, for example, from EP 0 340 625 A1.

The object of the disclosure is to improve the dynamics of the actuator. This is achieved by means of an actuator and a valve having the features of the claims.

SUMMARY

An electromagnetic actuator is proposed, in particular a valve actuator, having a first magnetic coil and a first permanent magnet, as well as an anchor that can be moved axially by the magnetic coil and the permanent magnet between a first and second position (switching positions), counter to which at least one spring device acts in the axial direction. The spring device can be composed, for example, of one or more helical springs or wave springs. It is provided that the actuator has a second magnetic coil, and that the first and second magnetic coils, as well as the permanent magnet, are disposed axially behind one another, such that the permanent magnet is disposed axially between the first and second magnetic coils. As a result of this configuration of the permanent magnet, increased dynamics of the actuator can be obtained.

The anchor is preferably subjected to tension in both the first and second positions by means of the spring device. As a result, the kinetic energy otherwise lost in these positions is stored by the spring (spring/pendulum principle). Through an appropriate sizing and design of the spring device, as well as the permanent magnet, it is possible to ensure that the actuator can remain in only one or in both positions, when the actuator is not supplied with current, through magnetic locking (monostable, bistable). With an appropriate arrangement of the permanent magnet and the magnetic coils, a deflection or folding of the magnetic flux in the actuator can be enabled. The anchor can be moved very dynamically into the first or second position as a result. In particular, the magnetic coils are designed as annular coils, and disposed coaxially in relation to one another. Likewise, the permanent magnet can be designed as an annular magnet, and disposed coaxially to the magnetic coils.

The actuator preferably has a second permanent magnet, which is disposed axially to the magnetic coils and the first permanent magnet, thus resulting in the axial sequence: first magnetic coil, first permanent magnet, second magnetic coil, second permanent magnet.

It can be provided that the first permanent magnet has a different field strength than the second permanent magnet, in particular a greater field strength. In other words, the first permanent magnet preferably thus forms a stronger magnetic field than the second permanent magnet. The coils are preferably designed such that the first coil has a different, stronger magnetic field strength than the second coil when supplied with the same electrical current. This can be achieved, for example, in that the first coil has more windings than the second coil.

The (first and/or second) permanent magnet is preferably designed as an annular magnet. It is magnetized radially thereby, such that the magnetic north and south poles lie opposed to one another radially. By way of example, the magnetic north pole lies radially on the outside of the annular magnet and the south pole lies radially within the annular magnet, or vice versa. Conversely, with an axial magnetization, the magnetic north pole is axially spaced apart from the magnetic south pole. As a result of the radial magnetization, a particularly effective distribution of the permanent magnetic flux is obtained in the actuator.

Moreover, the anchor preferably has an anchor plate on at least one of its end surfaces, or in particular on both of its end surfaces. The anchor plate, or anchor plates, respectively, serve in particular for an effective guidance of the magnetic field inside the actuator. They generate a majority of the magnetic force acting on the anchor. The anchor plate preferably bears on a magnet yoke of the actuator, when the anchor is in the first or second position. At this point, an air gap between the anchor and yoke is at a minimum, and the magnetic force acting on the anchor is at a maximum.

The spring device is preferably designed such that it exerts a return force on the anchor when it is moved from a middle position toward the first or second position. Accordingly, the middle position is a (middle) position provided, geometrically or otherwise, between the first and second positions. For this, the anchor can be subjected to a spring load from two sides, for example. In particular, a first spring acts against a first end surface of the anchor, and a second spring acts against a second end surface of the anchor for this.

The spring device is preferably designed such that either the first and second position are stable positions, in which the anchor remains when the actuator is not supplied with current (bistable), or it is designed such that only one of the first and second positions is a stable position, in which the anchor remains when the actuator is not supplied with a current (monostable). This is achieved, in particular, by means of an appropriately designed force/path curve and/or tensioning of the spring device. For this, a tensioning of the anchor at its middle position, or in the first or second position, can be exerted on the anchor by means of the spring device, for example.

The magnetic coils and the permanent magnet(s) are preferably disposed coaxially to one another on a magnet yoke of the actuator. The spring device has at least one spring thereby one of the end surfaces, or alternatively on both of the end surfaces, of the magnet yoke (i.e. in the region of one of the end surfaces or both of the end surfaces). When springs are provided on both opposing ends, they preferably act in the axial direction, and in opposing directions, on the anchor. As a result, it is possible to achieve that the anchor is pushed back into its middle position when it has been deflected into the first or second position, or into another stable end position (which can also be the first or second position), i.e. a force acting toward the middle position, or the stable end position is exerted.

The actuator explained above is used, in particular, with a valve, e.g. a pneumatic or hydraulic valve, in order to actuate the valve, e.g. in order to open it and/or close it. This is then a valve actuator.

For this reason, a valve is also proposed, having a closing element for blocking a discharge opening of the valve, and having an electromagnetic actuator for moving the closing element into an open position, in which the discharge opening is open, and into a closed position, in which the discharge opening is closed. In the opened state, a fluid, e.g. a liquid or gas, can flow through the valve through the discharge opening, and in the closed state, the flow of the fluid through the discharge opening, and thus the valve, is blocked. The proposed valve contains the actuator for moving the closing element of the proposed actuator. As a result, the valve exhibits particularly high dynamics. It can therefore be transferred particularly quickly into the open state or the closed state. Despite the high dynamics, it exhibits a slight impulse load in the end position.

BRIEF DESCRIPTION OF THE DRAWINGS

The invention shall be explained in greater detail below based on the figures, from which preferred embodiments of the invention can be derived. In the figures, in schematic depictions in each case.

DETAILED DESCRIPTION OF EXAMPLE EMBODIMENTS

Identical components, or components having at least the same function, are provided with identical reference symbols in the figures.

Figure 1:
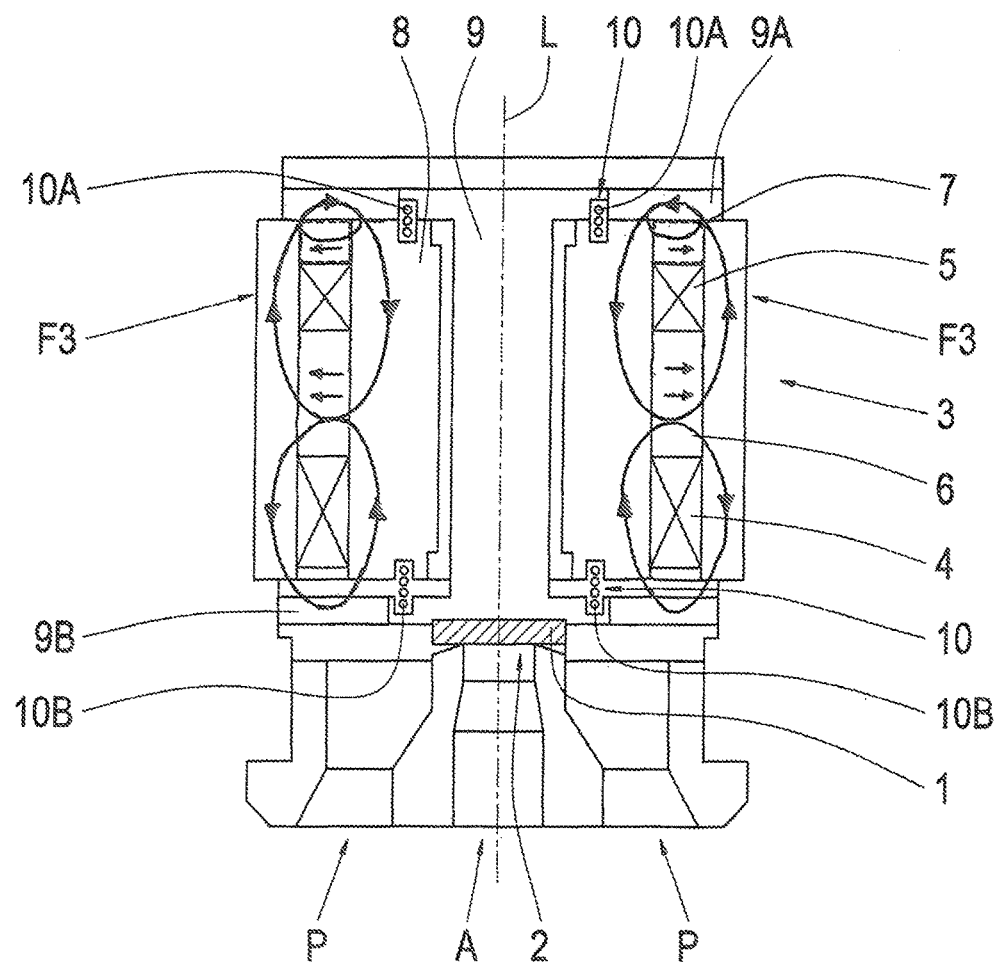
FIG. 1 shows an embodiment of a valve in a closed position.
Figure 2:
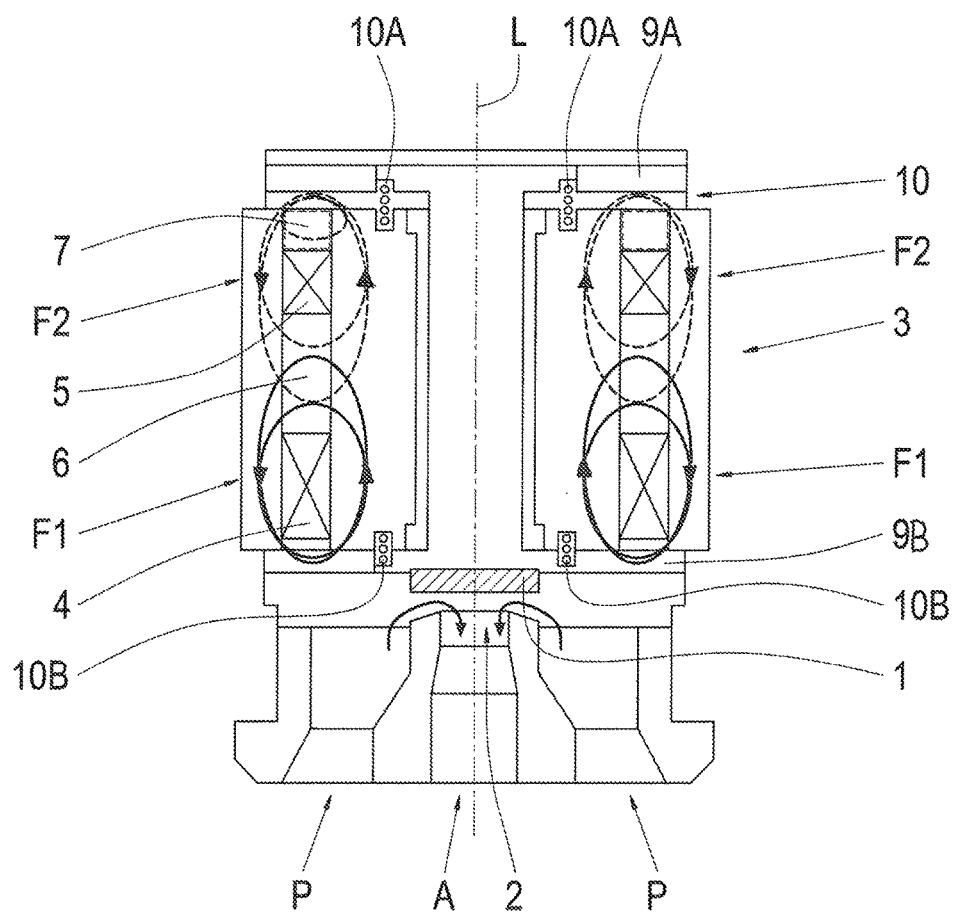
FIG. 2 shows the embodiment according to FIG. 1, in an open position.

FIGS. 1 and 2 show a valve that can be actuated electrically, by means of which a flow of fluid through the valve can be prevented (valve is closed, see state illustrated in FIG. 1), and enabled (valve is open, see state illustrated in FIG. 2).

The valve is a pneumatic valve in particular. The valve has a closing element 1 for blocking a discharge opening 2 of the valve, and an electromagnetic actuator 3, for moving the closing element 1. The closing element 1 can be moved by the actuator 3 in the longitudinal direction L of the valve/actuator 3. In an open position of the closing element 1, the discharge opening 2 is open, and in a closed position of the closing element 1, the discharge opening 2 is closed. The closed position is depicted in FIG. 1, and the open position is depicted in FIG. 2. The valve has at least or exactly one inflow P and at least or exactly one discharge A. Depending the position of the closing element 1, the pressure in the discharge A is equal to or less than the pressure in the inflow P. By way of example, the inflow P is located radially outside the discharge A, as is shown in the figures. It is possible that the discharge A is exchanged with the inflow P, i.e. the discharge A is located radially outside the inflow P.

The actuator 3 is designed as an electromagnetic actuator, and has at least one first magnetic coil 4, as well as one second magnetic coil 5. Furthermore, at least or exactly one permanent magnet 6 is provided, which is disposed axially between the first and second magnetic coils 4, 5 (seen in the longitudinal direction L). Furthermore, a second permanent magnet 7 can optionally be provided. The second permanent magnet 7 is then disposed on the end surface of the second coil 5 lying opposite the first permanent magnet 6. Thus, the sequence is obtained in the axial direction (seen from bottom to top in the figures): first magnetic coil 4, first permanent magnet 6, second magnetic coil 5, second permanent magnet 7. The permanent magnets 6, 7 and the coils 4, 5 are permanently disposed coaxially to one another on a magnet yoke 8, and have an annular design (annular magnets 6, 7; annular coils 4, 5).

Furthermore, the actuator has at least one axially moving anchor 9. The anchor 9 can be moved axially between a first and second position (switching positions) by the magnetic coils 4, 5 and at least the first permanent magnet 6, and preferably has a cylindrical design. A spring device 10 of the actuator acts on the anchor 9 in the axial direction.

By supplying the magnetic coils 4, 5 with the appropriate current, the anchor 9 can thus be moved in order to open or close the valve. For this, the anchor 9 is connected to the closing element 1. In the illustrated valve, this is achieved, by way of example, in that the closing element 1 is attached directly to the anchor 9, in that it is glued, screwed, or clipped thereto. The closing element 1 is made, for example, of an elastic sealing material, e.g. rubber.

As is illustrated, the anchor 9 has an anchor plate 9A, 9B on one, or preferably both, (axial) end surfaces. The anchor plates 9A, 9B serve as a guidance for magnetic field generated by the coils 4, 5 and the permanent magnets 6, 7. An air gap between the anchor plates 9A, 9B and the magnet yoke 8 determines substantially the magnetic force acting on the anchor 9, i.e., as the air gap increases, the magnetic force decreases proportionally.

The spring device 10 is composed substantially of the springs 10A and 10B disposed on the end surfaces of the magnet yoke 8. The springs 10A act on the anchor 9 counter to the springs 10B in the axial direction. Alternatively, just one spring 10A, 10B could be provided on each end surface, or just one spring could be provided on exactly one of the end surfaces, which is then designed as a push-pull spring. The spring device 10 is designed such that the overall spring force acting on the anchor 9 is stable in a middle position between its first and second positions, or at another stable end position (e.g. the first or second position). This is obtained by means of an appropriate force/path curve and/or an appropriate tensioning of the spring device 10. It is fundamentally possible to use a different suitable design for the spring device, e.g. comprising one or more springs in the region of the closing element 1 and/or one or more springs on the end of the anchor 9 lying opposite the closing element 1.

If it is provided, the second permanent magnet 7 as a different magnetic field strength than the first permanent magnet 6. In particular, the field strength of the first permanent magnet 6 is greater than the field strength of the second permanent magnet 7. The coils also preferably have different magnetic field strengths when supplied with the same electrical current. In particular, the first coil has a greater magnetic field strength than the second coil when supplied with the same electrical current.

The coils 4, 5 are preferably connected in series electrically. As a result, the electrical current conducted through the coils 4, 5 is always the same. The second coil 5 is designed thereby, such that the magnetic field generated by the second coil 5 has a polarity directed in the same direction as the magnetic field of the first coil 4, e.g. the coils 4, 5 are connected such that the current is conducted through them in the same direction. This is shown by way of example in FIG. 2. The field lines F1 of the magnetic field of the first coil 4 run in the same direction as the field lines F2 of the second coil 5 (see radially inside/outside the coils 4, 5).

The first permanent magnet 6, and if present, the second permanent magnet 7 are designed, as explained above, as annular magnets, by way of example. They are magnetized radially, such that the magnetic north pole and south pole lie radially in relation to one another. Thus, by way of example, the magnetic north pole of the permanent magnets 6, 7 lies in each case inside the respective permanent magnet 6, 7, and the magnetic south pole of the permanent magnets 6, 7 lies, in each case, outside the respective permanent magnet 6, 7, or vice versa. Magnetic field lines F3 of the permanent magnets 6, 7 are shown by way of example in FIG. 1. An exemplary magnetization direction of the permanent magnets 6, 7 is illustrated by small arrows in the permanent magnets 6, 7.

With the configuration of the valve, or actuator 3, respectively, shown in FIG. 1, the coils 4, 5 are not supplied with current. I.e. no electrical current is conducted through the coils 4, 5, such that they do not form a magnetic field at this point. The permanent magnets 6, 7 form a magnetic field, the field lines of which are indicated with F3. This magnetic field cause a resulting magnetic force in the direction of the magnet yoke 8 in the anchor 9, or the anchor plates 9A, 9B, respectively. A counteracting spring force is generated by the spring device 10. The spring force is lower than the magnetic force, however, such that anchor 9 remains in the position illustrated in FIG. 1, in which the anchor plate 9a bears on the magnet yoke 8. In this position, the anchor 9 pushes the closing element 1 against the discharge opening 2 of the valve, such that it, and thus the valve, is closed.

In order to open the valve, the coils 4, 5 are supplied with electrical current, as shown in FIG. 2. As a result, the magnetic fields are formed, running in the same direction, indicated by the field lines F1 and F2. The magnetic field F2 generated by the second coil 5 runs in the opposite direction of the magnetic field F3 generated by the permanent magnets 6, 7 (cf. FIG. 1). As a result, the magnetic field F3 is weakened in the region of the second permanent magnet 7. The overall magnetic field (resulting from the magnetic fields F3 of the permanent magnets 6, 7, and the magnetic fields F1, F2 of the coils 4, 5) has a relatively weak field strength in the region of the first (upper, in the figure) anchor plate 9A located there as a result (in FIG. 2, the field lines F2 are thus illustrated with a broken line, unlike the field lines F1). The magnetic force acting there on the anchor 9, or the anchor plate 9A, in the direction of the magnet yoke 8, is reduced accordingly (the magnetic force acts downwards there in the Figures).

As a result of the electrical current conducted in the same direction through the first coil 4, the overall magnetic field, in contrast, is relatively strong in the region of the second (lower, in the figures) anchor plate 9B there, thus on the opposite end of the anchor 9, thus having a relatively high field strength (In FIG. 2, the field lines F1 are thus illustrated with a continuous line, in contrast to the field lines F2). The magnetic field F1 of the first coil 4 is also oriented in the same direction as the magnetic field F3 of the permanent magnet 6 there (cf. FIG. 1). Thus, a relatively high magnetic force acts on the anchor 9 or the anchor plate 9B there, in the direction of the magnet yoke 8 (the magnetic force acts in an upward direction there in the figures). The resulting magnetic force, in conjunction with the spring force of the spring device 10, likewise acting on the anchor 9, results in the (upper) first anchor plate 9A being released from the magnet yoke 8, and the opposite (lower) second anchor plate 9B being moved in the direction of the magnet yoke 8, and subsequently bearing against it. The closing element 1 is lifted thereby from the discharge opening 2, and opened to allow a flow of fluid. As a result, the opened state of the valve shown in FIG. 2 is obtained.

The spring device 10 supports the movement of the anchor 9 thereby until reaching a middle position, lying between the maximum positions of the anchor 9 shown in FIGS. 1 and 2. Starting at this middle position, the spring force acts against further movement/deflection of the anchor 9. However, the current to the coils 4, 5 is sufficient to bring the anchor plate 9B to bear against the magnet yoke 8 by magnetic force. In this position, the closing element 1 is moved as far away from the discharge opening 2 as possible, and the valve is thus open to the maximum extent. With a (lower) current applied to the coils 4, 5, an intermediate position could be set, at which the magnetic forces and the spring forces, as well as the pressures generated by the fluid in the valve, offset one another, and at which the valve is merely partially open.

To close the valve, thus to transfer the actuator 3 from the configuration shown in FIG. 2, to the configuration shown in FIG. 1, the supply of electrical current to the coils 4, 5 is stopped, or the electrical current being supplied is reduced sufficiently. The magnetic fields F1, F2 generated by the coils thus break down. The magnetic field F3 generated by the permanent magnet(s) 6, 7 is then no longer weakened. The magnetic force support in the region of the permanent magnet 6 through the first coil 4 disappears. The magnetic force to the anchor 9 in the region of the anchor plate 9A then increases, or is increased, and reduces in the region of the anchor plate 9B, or is reduced, respectively. In conjunction with the spring force of the spring device 10, the anchor is moved back as a result, such that the anchor plate 9A again bears on the magnet yoke 8, resulting in the closing element 1 ultimately being pressed against the discharge opening 2 again. The valve is thus again in the position according to FIG. 1, and is closed.

A valve is provided by means of the measures described herein, which is closed when no current is applied (normally closed). By reversing the axial sequence of the coils 4, 5 and the permanent magnets 6, 7, it is also possible to cause the anchor 9 to be lifted from the discharge opening 2 when no current is applied, such that the valve is designed as being normally open. This corresponds to an assembly of the closing element 1 on the opposite side of the anchor 9, thus in the region of the anchor plate 9A.

With an appropriate selection of the field strengths of the coils 4, 5, and the permanent magnet(s) 6, 7, it is also possible to create an actuator or valve, respectively, in which the anchor 9 is held against the magnet yoke 8 at both end positions thereof, when no current is applied. The monostable actuator 3 shown in FIGS. 1 and 2 can thus also be designed as a bistable actuator 3.

Fundamentally, the actuator 3 can also be used in a different manner, thus outside valve technology, e.g. for moving a shifting element in a transmission or another object.

REFERENCE SYMBOLS

1 Closing element
2 Discharge opening

3 Actuator
4 Magnetic coil
5 Magnetic coil
6 Permanent magnet
7 Permanent magnet
8 Magnet yoke
9 Anchor
9A Anchor plate
9B Anchor plate
10 Spring device
10A Spring
10B Spring
A Discharge
F1, F2, F3 Field lines/Magnetic field
L Longitudinal axis
P Inflow

The invention claimed is:

1. An electromagnetic actuator comprising:
a first magnetic coil;
a first permanent magnet,
an anchor configured to be moved axially by the first magnetic coil and the first permanent magnet between a first position and a second position, wherein a spring device is connected to the anchor and acts in the axial direction on the anchor, wherein the spring device is configured to exert a return force on the anchor as soon as the anchor is moved from a middle position toward the first position or the second position, wherein the first position is a closed position and the second position is an open position, and
a second magnetic coil,
wherein the first and second magnetic coils as well as the first permanent magnet are disposed axially, such that the first permanent magnet is disposed axially between the first and second magnetic coils.

2. The electromagnetic actuator according to claim 1, further comprising a second permanent magnet, wherein the second permanent magnet is disposed axially with the first magnetic coil, the second magnetic coil, and the first permanent magnet in a sequence:
first magnetic coil,
first permanent magnet,
second magnetic coil,
second permanent magnet.

3. The electromagnetic actuator according to claim 2, wherein the first permanent magnet has a greater magnetic field strength than the second permanent magnet.

4. The electromagnetic actuator according to claim 2, wherein the first magnetic coil has a greater magnetic field strength than the second magnetic coil when the same electrical current is supplied.

5. The electromagnetic actuator according to claim 2, wherein the first and second permanent magnets are annular magnets, and are magnetized radially such that the magnetic north and south poles are oriented radially in relation to one another.

6. The electromagnetic actuator according to claim 1, wherein the anchor has an anchor plate on at least one end surface.

7. The electromagnetic actuator according to claim 2, wherein the first and second magnetic coils and the first and second permanent magnets are disposed coaxially on a magnet yoke having at least two end surfaces, wherein the spring device has at least one spring on one or both end surfaces of the magnet yoke.

8. A valve comprising:
a closing element configured to block a discharge opening of the valve, and
an electromagnetic actuator configured to move the closing element into an open position in which the discharge opening is open, and configured to move the closing element into a closed position in which the discharge opening is closed, wherein the electromagnetic actuator is the electromagnetic actuator according to claim 1.

9. The electromagnetic actuator according to claim 1, wherein the anchor has anchor plates on at least two end surfaces.

10. The electromagnetic actuator according to claim 1, wherein a magnetic field generated by the first magnetic coil has a polarity directed in the same direction as a magnetic field generated by the second magnetic coil.

11. The electromagnetic actuator according to claim 1, wherein a spring force of the spring device is weaker than a magnetic force of the first permanent magnet.

12. The electromagnetic actuator according to claim 2, wherein a magnetic field generated by the second magnetic coil is oriented in a direction substantially opposite as a magnetic field generated by the first and second permanent magnets.

13. The electromagnetic actuator according to claim 7, wherein an air gap between the anchor and the magnet yoke substantially determines the magnetic force acting on the anchor.

14. The electromagnetic actuator according to claim 1, wherein the spring device comprises a first spring and a second spring, wherein the first spring acts on the anchor counter to the second spring in an axial direction.

15. A method of open a valve, wherein the valve has a closing element blocking a discharge opening of the valve and the closing element is configured to be moved by an electromagnetic actuator comprising a first magnetic coil, a second magnetic coil, a first permanent magnet disposed between the first and second magnetic coils, a second permanent magnet disposed axially adjacent to the second magnetic coil, an anchor with an upper anchor plate and a lower anchor plate coupled to the closing element, a magnet yoke releasable coupled to the upper anchor plate, and a spring device connected to the anchor that acts in the axial direction on the anchor, wherein the spring device is configured to exert a return force on the anchor as soon as the anchor is moved, the method comprising:
supplying electrical current to the first and second magnetic coils in order to generate magnetic fields in the coils that are oriented in the same direction, wherein the magnetic field generated by the second magnetic coil is oriented in an opposite direction of a magnetic field generated by the second permanent magnet in a region near the upper anchor plate,
weakening the magnetic field strength of the second permanent magnet in the region near the upper anchor plate,
releasing the upper anchor plate from the magnet yoke,
moving the lower anchor plate toward the magnet yoke,
moving the closing element off the discharge opening.

16. The method according to claim 15, wherein the first permanent magnet has a greater magnetic field strength than the second permanent magnet.

* * * * *

UNITED STATES PATENT AND TRADEMARK OFFICE
CERTIFICATE OF CORRECTION

| | |
|---|---|
| PATENT NO. | : 10,190,699 B2 |
| APPLICATION NO. | : 15/446249 |
| DATED | : January 29, 2019 |
| INVENTOR(S) | : Markus Ulbricht, Michael Pantke and Raphael Baumann |

It is certified that error appears in the above-identified patent and that said Letters Patent is hereby corrected as shown below:

In the Claims

Column 8, Line 34, Claim 15, after "A method of", delete "open", insert --opening--

Signed and Sealed this
Second Day of April, 2019

Andrei Iancu
*Director of the United States Patent and Trademark Office*